(12) United States Patent
Kang et al.

(10) Patent No.: US 12,088,104 B2
(45) Date of Patent: Sep. 10, 2024

(54) ENERGY MANAGEMENT SYSTEM AND METHOD OF OPERATION THEREOF

(71) Applicant: EN Technologies Inc., Gyeonggi-do (KR)

(72) Inventors: Hyun Jae Kang, Seoul (KR); Seung Sig Nam, Gyeonggi-do (KR); Tay Seek Lee, Gyeonggi-do (KR); Seong Ho Yun, Seoul (KR); Hee Se Hong, Gyeonggi-do (KR)

(73) Assignee: EN TECHNOLOGIES INC., Gyeonggi-do (KR)

( * ) Notice: Subject to any disclaimer, the term of this patent is extended or adjusted under 35 U.S.C. 154(b) by 0 days.

(21) Appl. No.: 18/442,371

(22) Filed: Feb. 15, 2024

(65) Prior Publication Data

US 2024/0275168 A1    Aug. 15, 2024

(30) Foreign Application Priority Data

Feb. 15, 2023  (KR) .................. 10-2023-0019855

(51) Int. Cl.
| | | |
|---|---|---|
| H02J 3/32 | (2006.01) | |
| H02J 3/00 | (2006.01) | |
| H02J 3/38 | (2006.01) | |
| H02J 7/00 | (2006.01) | |
| H02J 13/00 | (2006.01) | |

(52) U.S. Cl.
CPC ............ *H02J 3/32* (2013.01); *H02J 3/00125* (2020.01); *H02J 3/381* (2013.01); *H02J 7/0013* (2013.01); *H02J 7/0063* (2013.01); *H02J 7/00712* (2020.01); *H02J 13/00001* (2020.01); *H02J 2203/10* (2020.01); *H02J 2300/20* (2020.01)

(58) Field of Classification Search
CPC .......................................................... H02J 3/32
USPC .......................................................... 320/101
See application file for complete search history.

(56) References Cited

U.S. PATENT DOCUMENTS

| | | | | |
|---|---|---|---|---|
| 2011/0004357 A1* | 1/2011 | Mathiowetz | ............ | H02J 3/381 |
| | | | | 700/295 |
| 2013/0099564 A1* | 4/2013 | Hsu | ............... | H02J 3/003 |
| | | | | 307/23 |
| 2016/0322837 A1* | 11/2016 | Choi | ............... | H02J 3/466 |
| 2016/0344189 A1* | 11/2016 | Ozaki | ............... | H02J 3/32 |

FOREIGN PATENT DOCUMENTS

| | | |
|---|---|---|
| KR | 10-2015-0026243 A | 3/2015 |
| KR | 10-1885518 B1 | 9/2018 |
| KR | 10-1971906 B1 | 4/2019 |
| KR | 10-2022-0105379 A | 7/2022 |

\* cited by examiner

*Primary Examiner* — Yalkew Fantu

(74) *Attorney, Agent, or Firm* — The PL Law Group, PLLC

(57) ABSTRACT

An energy management system and a method of operation thereof are provided. The energy management system includes a receiver that receives power amount information indicating an amount of power generated by a first new and renewable energy power plant, an amount of power stored in a first energy storage device for the first new and renewable energy power plant, an amount of power generated by a second new and renewable energy power plant, and an amount of power stored in a second energy storage device for the second new and renewable energy power plant and a controller that determines an operation mode for each of the first energy storage device and the second energy storage device based on the received power amount information.

12 Claims, 9 Drawing Sheets

ENERGY MANAGEMENT SYSTEM AND METHOD OF OPERATION THEREOF

CROSS REFERENCE TO RELATED APPLICATION AND CLAIM OF PRIORITY

This application claims the benefit under 35 USC § 119(a) of Korean Patent Application No. 10-2023-0019855, filed on Feb. 15, 2023, in the Korean Intellectual Property Office, the entire disclosure of which is incorporated herein by reference for all purposes.

BACKGROUND

1. Field

The present disclosure relates to an energy management system.

2. Description of Related Art

An electrical power system refers to a system in which an electric power station, a substation, a transmission and distribution line, and a load are integrated to generate and use power. The electric power station produces electricity and transmits the electricity to a transmission-end substation. The transmission-end substation transmits electricity to a distribution-end substation. The distribution-end substation divides and distributes electricity to final consumers. Meanwhile, there is a lot of interest in new and renewable energy with which electricity can be generated without carbon dioxide emission, and the expansion of new and renewable energy power stations is inevitable. As the new and renewable energy power stations are expanded, a technology capable of stably supplying power while efficiently using existing facilities is required.

In general, an amount of power to be supplied to users through an integrated line (a line that receives power from a substation connected to one or more electric power stations and delivers the power to power users) may be equal to a reference capacity of the integrated line. However, there may be cases where the amount of power less than the reference capacity of the integrated line should be supplied to users through the integrated line. For example, when a safety problem occurs on a user side or integrated line side, when the amount of power generated by the electric power station and substation is significantly low, etc., the maximum power to be continuously transmitted through the integrated line may be less than the reference capacity of the integrated line. Therefore, even in this case, a system that can consistently supply power less than the reference capacity of the integrated line is needed.

In addition, a general energy storage system (ESS) can charge or discharge power based on an amount of power generation of the new and renewable energy power station and the reference capacity of the line connected to the power plant. However, when the amount of power to be supplied through the integrated line described above is less than the reference capacity of the integrated line, the existing ESS charging/discharging method alone may not be able to supply the amount of power to be supplied through the integrated line. For example, the existing ESS charging/discharging method can only supply the same amount of power as the reference capacity of the integrated line through the integrated line. Therefore, even in this case, a system that determines the amount of charge/discharge power of the ESSs located in different regions through communication between electric power stations, substations, and/or corresponding energy storage devices is needed.

SUMMARY

Embodiments of the present disclosure are intended to improve line utilization by controlling a charging operation or discharging operation of the energy storage system.

Embodiments of the present disclosure are to manage the electrical power system so as to supply the amount of power to be supplied through the integrated line even when the amount of power to be supplied is less than the reference capacity of the integrated line.

Embodiments of the present disclosure are intended to appropriately determine the amount of charge/discharge power of the ESSs located in different regions through communication between electric power stations, substations, and/or corresponding energy storage devices in the electric power system.

An energy management system according to an embodiment includes a receiver that receives power amount information indicating an amount of power generated by a first new and renewable energy power station, an amount of power stored in a first energy storage device for the first new and renewable energy power station, an amount of power produced by a second new and renewable energy power station, and an amount of power stored in a second energy storage device for the second new and renewable energy power station, and a controller that determines an operation mode for each of the first energy storage device and the second energy storage device based on the received power amount information, and power generated by the first new and renewable energy power station is supplied to a first substation through a first line, power produced by the second new and renewable energy power station is supplied to a second substation through a second line, power generated in the first and second substations is supplied to a user through an integrated line, a reference capacity of the integrated line is equal to a sum of a reference capacity of the first line and a reference capacity of the second line, and an amount of power supplied to the user through the integrated line is less than the reference capacity of the integrated line.

A method of operation of an energy management system according to another embodiment includes receiving power amount information indicating an amount of power generated by a first new and renewable energy power station, an amount of power stored in a first energy storage device for the first new and renewable energy power station, an amount of power produced by a second new and renewable energy power station, and an amount of power stored in a second energy storage device for the second new and renewable energy power station, and determining an operation mode for each of the first energy storage device and the second energy storage device based on the received power amount information, and power generated by the first new and renewable energy power station is supplied to a first substation through a first line, power produced by the second new and renewable energy power station is supplied to a second substation through a second line, power generated in the first and second substations is supplied to a user through an integrated line, a reference capacity of the integrated line is equal to a sum of a reference capacity of the first line and a reference capacity of the second line, and an amount of power supplied to the user through the integrated line is less than the reference capacity of the integrated line.

An electrical power system according to still another embodiment includes a first new and renewable energy power station, a second new and renewable energy power station, a first energy storage device for the first new and renewable energy power station, a second energy storage device for the second new and renewable energy power station, a first line that supplies power generated by the first new and renewable energy power station to a first substation, a second line that supplies power produced by the second new and renewable energy power station to a second substation, and an integrated line that supplies power generated in the first substation and second substation to a user, a reference capacity of the integrated line being equal to a sum of a reference capacity of the first line and a reference capacity of the second line, an amount of power supplied to the user through the integrated line being less than the reference capacity of the integrated line, and an energy management system that receives power amount information indicating an amount of power generated by the first new and renewable energy power station, an amount of power stored in the first energy storage device, an amount of power produced by the second new and renewable energy power station, and an amount of power stored in the second energy storage device and determines an operation mode for each of the first energy storage device and the second energy storage device based on the received power amount information.

BRIEF DESCRIPTION OF THE DRAWINGS

The present disclosure may be readily understood in combination with the detailed description that follows and the accompanying figures, wherein reference numerals denote structural elements.

DETAILED DESCRIPTION

Figure 1:
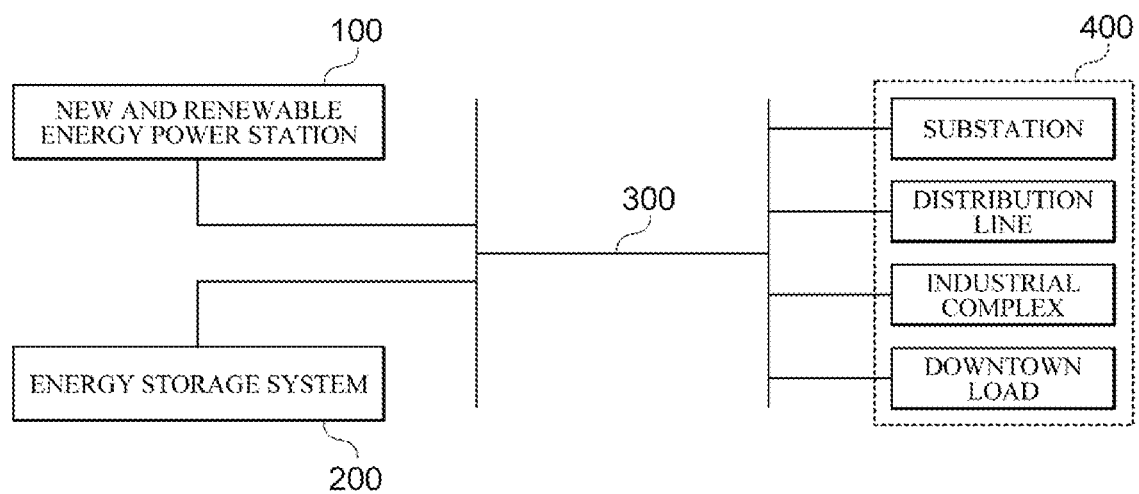
FIG. 1 illustrates a power system that controls a power capacity of a line for supplying power generated by a renewable energy power station to an electrical power system according to an embodiment.

Hereinafter, various embodiments will be described in detail with reference to the figures. Embodiments described below may be modified and implemented in various different forms. In order to more clearly describe the characteristics of the embodiments, a detailed description of matters widely known to those skilled in the art to which the following embodiments belong will be omitted.

Meanwhile, in this specification, when a configuration is said to be "connected" to another configuration, this includes not only the case of being 'directly connected', but also the case of being 'connected with another configuration in between'. In addition, when a configuration is said to "include" another configuration this means that it may further include other configurations rather than excluding other configurations unless otherwise specified.

In addition, terms including ordinal numbers such as 'first' or 'second' used in this specification may be used to describe various components, but the components should not be limited by the terms. These terms are only used for the purpose of distinguishing one component from another component.

Throughout the specification, "new and renewable energy" means a combination of new energy and renewable energy. "New energy" refers to energy that is used by converting existing fossil fuels or that uses electricity or heat through chemical reactions such as hydrogen and oxygen. For example, types of new energy may include hydrogen energy, fuel cells, liquefied coal gas, etc. "Renewable energy" means energy used by converting renewable energy including sunlight, water, geothermal heat, precipitation, biological organisms, etc. For example, types of renewable energy may include sunlight, solar heat, wind power, hydropower, ocean energy, geothermal heat, bioenergy, waste energy, etc.

Throughout the specification, the "new and renewable energy power station" means a place that generates electricity by converting new and renewable energy into electrical energy.

Throughout the specification, the "energy storage system (ESS)" refers to a system that stores excess power and uses it when the power is insufficient or delivers the power where needed. The energy storage system may charge part of power supplied from a power plant and discharge charged power when the power is insufficient.

Throughout the specification, the "line" refers to a path that is connected to a new and renewable energy power station and the energy storage system and supplies power received from the new and renewable energy power station or energy storage system to a load. For example, the line supplies power received from the new and renewable energy power station and/or energy storage system to a substation.

A "reference capacity" of the line means an amount of power that can be transmitted through the line. The reference capacity of the line may be a maximum transmission capacity or a preset transmission capacity. That is, reference capacity of the line and the amount of power actually transmitted (or supplied) through the line may have different values. For example, the amount of power actually supplied through the line is less than the reference capacity of the line.

FIG. 1 illustrates a power system that controls a power capacity of a line 300 for supplying power generated by a new and renewable energy power station 100 to an electrical power system according to an embodiment.

Referring to FIG. 1, the power system may be configured with the new and renewable energy power station 100, an energy storage system 200, a line 300, and a load 400. For example, the load 400 may be a substation, a distribution line, an industrial complex, a downtown load, etc.

The new and renewable energy power station 100 according to one embodiment may be an electric power station that generates power by converting the renewable energy described above into electrical energy. That is, the new and renewable energy power station can convert the flow of renewable energy into mechanical energy and then convert it into electric power using the phenomenon of electromagnetic induction.

For example, the new and renewable energy power station 100 may be a solar power station, a wind power station, a tidal power station, a wave power station, a fuel cell power station, a bio power station, etc., and is not limited to the above examples.

The substation according to one embodiment may be a facility for changing the properties of voltage and/or current in the process of receiving power generated by the electric power station through the line and supplying it to users (or consumers). For example, the substation refers to a step-up substation that increases the generated voltage, a step-down substation that lowers the generated voltage, etc.

The substation according to one embodiment may include a primary substation that initially receives power from the electric power station and adjusts the voltage, and/or a secondary substation that steps down the power before supplying the power to users.

The energy storage system 200 according to one embodiment may charge all or part of power produced by the new and renewable energy power station 100 to an energy storage device 250, or discharge the power charged in the energy storage device 250 depending on the state of the line 300 or the load 400. For example, it is assumed that power as much as a reference capacity can be transmitted through the line 300. When power produced by the new and renewable energy power station 100 exceeds the reference capacity, a storage space for storing the excess power or an additional line for accommodating the excess power is required. The energy storage system 200 may store the excess power and supply power when needed even without installing an additional line.

For example, when the power produced by the new and renewable energy power station 100 exceeds the reference capacity of the line 300, the energy storage system 200 may charge an amount of power as much as the power exceeding the reference capacity of the line 300 for the power produced by the new and renewable energy power station 100. By charging the excess power in the energy storage system 200, the capacity of the line 300 may be maintained as much as the reference capacity.

For example, if the power produced by the new and renewable energy power station 100 does not exceed the reference capacity of the line 300, the line 300 may additionally accommodate power other than the power produced by the new and renewable energy power station 100. In this case, the energy storage system 200 may discharge all or part of the charged power to the line 300.

That is, the energy storage system 200 may control the operation of the energy storage system 200 so that a power capacity flowing through the line 300 is equal to the reference capacity.

Even if the new and renewable energy power station 100 is additionally expanded by the energy storage system described in this figure, the electrical power system including the electric power stations, transmission and distribution lines, and/or loads can operate and stabilize the system without additional expansion of lines for the expanded new and renewable energy power station 100. That is, the electrical power system can reduce the cost of line expansion through the energy storage system described in this figure. In addition, the electrical power system can be stabilized by using existing facilities even when expanding the new and renewable energy power station 100 through the energy storage system described in this figure.

Figure 2:
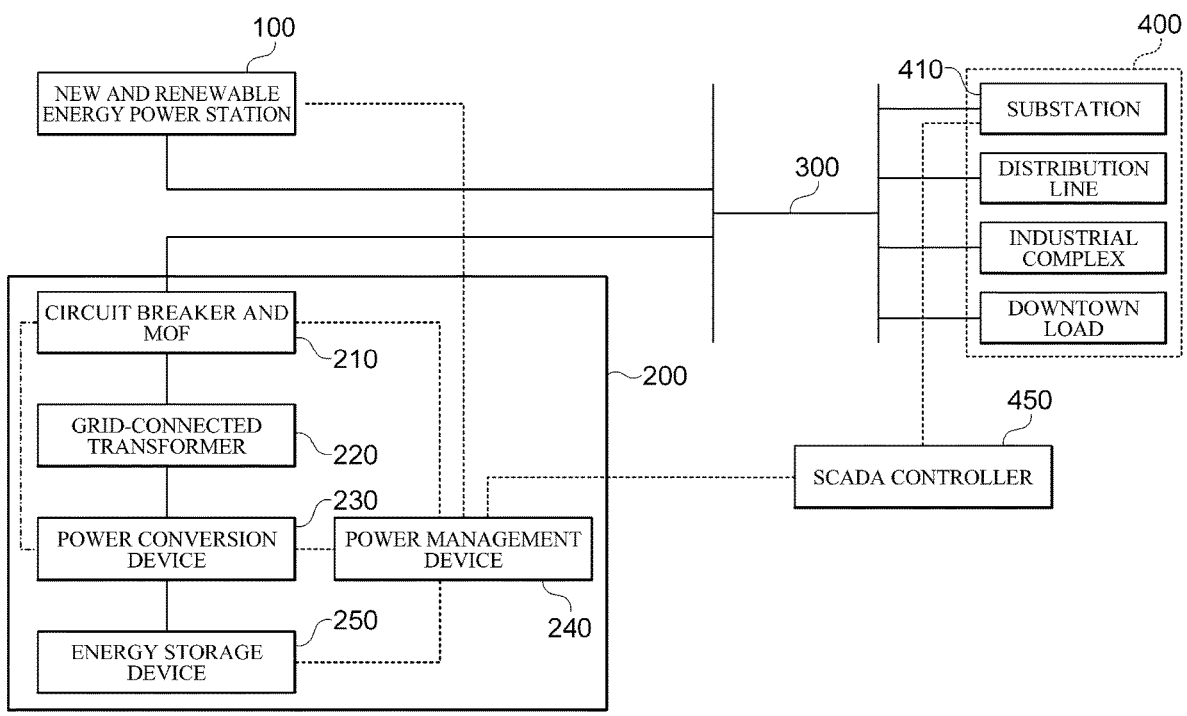
FIG. 2 is a block diagram illustrating a configuration of an energy storage system according to an embodiment.

FIG. 2 is a block diagram illustrating a configuration of the energy storage system 200 according to an embodiment.

Referring to FIG. 2, the energy storage system 200 may include a circuit breaker and MOF 210, a grid-connected transformer 220, a power conversion device 230, an energy storage device 250, and/or a power management device 240. However, not all illustrated components are essential components. The energy storage system 200 may be implemented with more components than those illustrated, and the energy storage system 200 may be implemented with fewer components. Hereinafter, the above components will be described. The energy storage system 200 illustrated in FIG. 2 may correspond identically to the energy storage system 200 illustrated in FIG. 1.

The circuit breaker and MOF 210 according to one embodiment may monitor whether abnormal voltage, abnormal current, abnormal frequency, or abnormal temperature are detected on the energy storage system 200 and stop the operation of the energy storage system 200 when an abnormality occurs in order to protect the energy storage system 200.

The grid-connected transformer 220 according to one embodiment may adjust the magnitude of voltage in order to supply power to the electrical power system side. Since power loss occurs due to resistance of the line 300, the grid-connected transformer 220 may supply power by increasing the magnitude of voltage.

The energy storage device 250 according to one embodiment may store energy generated by the new and renewable energy power station 100. For example, the energy storage device 250 may include a battery and a battery management module. The battery may discharge charged power or charge power through the power conversion device 230 according to an operation mode of the energy storage device 250. The battery management module may manage state information of the battery.

The power management device 240 according to one embodiment may monitor an amount of power of the new and renewable energy power station 100. The power management device 240 may determine the operation mode of the energy storage device 250 based on a result of monitoring the amount of power and the reference capacity of the line 300 connected to the new and renewable energy power station 100. The power management device 240 may control the power capacity flowing through the line 300 according to the operation mode of the energy storage device 250.

The power conversion device 230 according to one embodiment may receive a command corresponding to the operation mode of the energy storage device 250 from the power management device 240 and control the operation of the energy storage device 250 according to the command.

For example, the power management device 240 may obtain state information, operational information, operating information, and operation availability information of the power conversion device 230 from the power conversion device 230. The state information of the power conversion device 230 may be information such as an operating state, circuit breaker information, network, etc. The operational information of the power conversion device 230 may be information such as voltage, current, power, frequency, inverter, etc. The operating information of the power conversion device 230 may be information such as an operating mode, a charge amount, a discharge amount, an accumulated charge amount, an accumulated discharge amount, etc. The operation availability information of the power conversion device 230 may be information such as abnormal voltage, abnormal current, abnormal frequency, abnormal temperature for protection of the power conversion device 230, etc.

For example, the power management device 240 may obtain information such as a state of battery circuit breaker, temperature, voltage, current, power, charge amount, discharge amount, accumulated charge amount, accumulated discharge amount, etc. and battery operation availability by communicating with the battery management module.

For example, when the amount of power of the new and renewable energy power station 100 exceeds the reference capacity of the line 300, the power management device 240 may determine the operation mode of the energy storage device 250 as a charge mode. The power management device 240 may deliver a first command for controlling such that excess power of the amount of power exceeding the reference capacity of the line 300 is stored in the energy storage device 250 to the power conversion device 230. The power conversion device 230 may store excess power in the energy storage device 250 according to the first command. The energy storage device 250 may store DC power converted to DC.

For another example, when the amount of power of the new and renewable energy power station 100 does not exceed the reference capacity of the line 300, the power management device 240 may determine the operation mode of the energy storage device 250 as a discharge mode. The power management device 240 may deliver a second command for discharging the power charged in the energy storage device 250 to the power conversion device, based on the amount of power of the new and renewable energy power station 100, so that the power capacity flowing through the line 300 is equal to the reference capacity. The power conversion device 230 may discharge the power charged in the energy storage device 250 according to the second command.

For example, when a newly installed new and renewable energy power station 100 other than the new and renewable energy power station 100 is connected to the energy storage system 200 and the line 300, the power management device 240 may determine the operation mode of the energy storage device 250 based on the results of monitoring the amount of power of the new and renewable energy power station 100 and the newly installed new and renewable energy power station 100 and the reference capacity of the line 300. That is, even if the new and renewable energy power station 100 is additionally installed, power exceeding the reference capacity of the line 300 is charged to the energy storage device 250, thereby contributing to stabilizing the electrical power system even without the expansion of the line 300.

For example, the power management device 240 may obtain history information about the amount of power produced by the new and renewable energy power station 100. The power management device 240 may predict the amount of power demanded by a new and renewable energy power station 100 to be newly installed based on the history information, the storage capacity of the energy storage device 250, and the reference capacity of the line 300. For example, the power management device 240 may obtain information on the amount of power produced by the new and renewable energy power station 100 during a preset time. The power management device 240 may calculate an average amount of power produced during a preset period based on information on the amount of power. The power management device 240 may predict the amount of power demand based on the average amount of the new and renewable energy power station 100, the storage capacity of the energy storage device 250, and the reference capacity of the line 300.

For example, the power management device 240 may generate, based on the amount of power demand, modeling information including information on a type of the new and renewable energy power station 100 to be newly installed and operational schedule corresponding to the type.

For example, the energy storage device 250 may include a battery and a battery management module. The battery may store DC power obtained by converting power of the new and renewable energy power station 100 from AC to DC through the power conversion device 230. For example, when the amount of power of the new and renewable energy power station 100 exceeds the reference capacity of the line 300, the battery may store power through a DC conversion device. In addition, the battery may discharge charged power through the power conversion device 230 to the electrical power system. For example, when the amount of power of the new and renewable energy power station 100 does not exceed the reference capacity of the line 300 or when the line 300 of electrical power system is repaired from a failure, the battery may discharge the charged power to the electrical power system.

The battery management module may obtain state information such as operating state of battery, remaining capacity of battery, durability of battery, temperature, voltage, current, charge amount, discharge amount, etc. The battery management module may cut off a circuit breaker when an abnormal state is detected in the battery.

The battery management module may provide the state information of the battery to the power management device 240 by communicating with the power management device 240. The power management device 240 may efficiently manage the battery using the state information of the battery provided from the battery management module.

In addition, the energy storage device 250 may include a circuit breaker that cuts off the DC power when an abnormality occurs from the power conversion device 230 and a fuse that protects the battery when an overcurrent occurs.

The power management device 240 may efficiently control charging or discharging of the energy storage system 200 by monitoring the amount of power from the new and renewable energy power station 100. Accordingly, even if the new and renewable energy power station 100 is newly established, the line 300 may be operated without the expansion of the line 300 by adjusting the load of the line 300 by the energy storage system 200.

Meanwhile, a SCADA controller 450 may obtain operating power information such as current, voltage, etc. by communicating with the substation 410. In addition, the SCADA controller 450 may obtain and monitor failure information of a transmission-end transformer and failure information of the transmission line 300. The power management device 240 may obtain operational information of the electrical power system, failure information of the transmission-end transformer, and failure information of the transmission line 300 by communicating with the SCADA controller 450.

Figure 3:
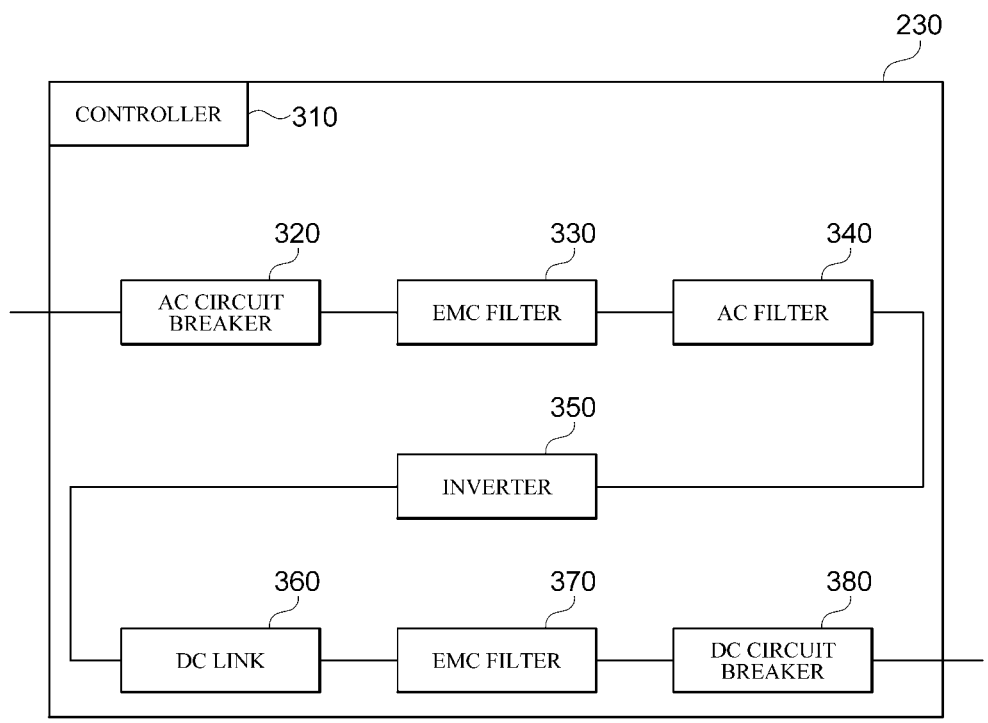
FIG. 3 is a block diagram illustrating a configuration of a power conversion device according to an embodiment.

FIG. 3 is a block diagram illustrating a configuration of the power conversion device 230 according to an embodiment.

Referring to FIG. 3, the power conversion device 230 may include a controller 310, an AC circuit breaker 320, an EMC filter 330, an AC filter 340, an inverter 350, a DC link 360, an EMC filter 370, and a DC circuit breaker 380.

The controller 310 may control the operation of the AC breaker 320, the EMC filter 330, the AC filter 340, the inverter 350, the DC link 360, the EMC filter 370, and the DC breaker 380.

The AC circuit breaker 320 may cut off the electrical power system side when an abnormality occurs in the electrical power system. The EMC filter 330 may reduce noise generated from the inverter. The AC filter 340 may reduce harmonics for sinusoidalization. The inverter 350 may be controlled to convert AC power into DC power. The DC link 360 may smooth the converted pulsating current into DC. The EMC filter 370 may reduce DC-side noise. The DC circuit breaker 380 may cut off a DC power source when an abnormality of the DC power source of the energy storage device 250 occurs.

Not all components illustrated in FIG. 3 are essential components. The power conversion device 230 may be implemented with more components than those illustrated in FIG. 3, and the power conversion device 230 may be implemented with fewer components. The power conversion device 230 illustrated in FIG. 3 may correspond identically to the power conversion device 230 illustrated in FIG. 2. The following operation may be performed by the operation of components of the power conversion device 230.

The power conversion device 230 may receive a command corresponding to the operation mode of the energy storage device 250 from the power management device 240, and control the operation of the energy storage device 250 such that power of the new and renewable energy power station 100 is charged in the energy storage device 250 or the power stored in the energy storage device 250 is discharged, according to the command.

For example, when the amount of power of the new and renewable energy power station 100 exceeds the reference capacity of the line 300, the power conversion device 230 may receive a command corresponding to the charge mode by communicating with the power management device 240 and charge the power of the new and renewable energy power station 100 in the energy storage device 250.

For example, when the amount of power of the new and renewable energy power station 100 does not exceed the reference capacity of the line 300, the power conversion device 230 may receive a command corresponding to the discharge mode by communicating with the power management device 240, and discharge the power stored in the energy storage device 250 to the electrical power system through the line 300.

For example, the power conversion device 230 may enable the energy storage system 200 to operate efficiently by providing the state information, operational information, operating information, and operation availability information of the power conversion device 230 to the power management device 240.

For example, the power conversion device 230 may monitor whether abnormal voltage, abnormal current, abnormal frequency, abnormal temperature, etc. are detected in the energy storage system 200, and stop the operation of the energy storage system 200 when an abnormal state is detected.

Figure 4:
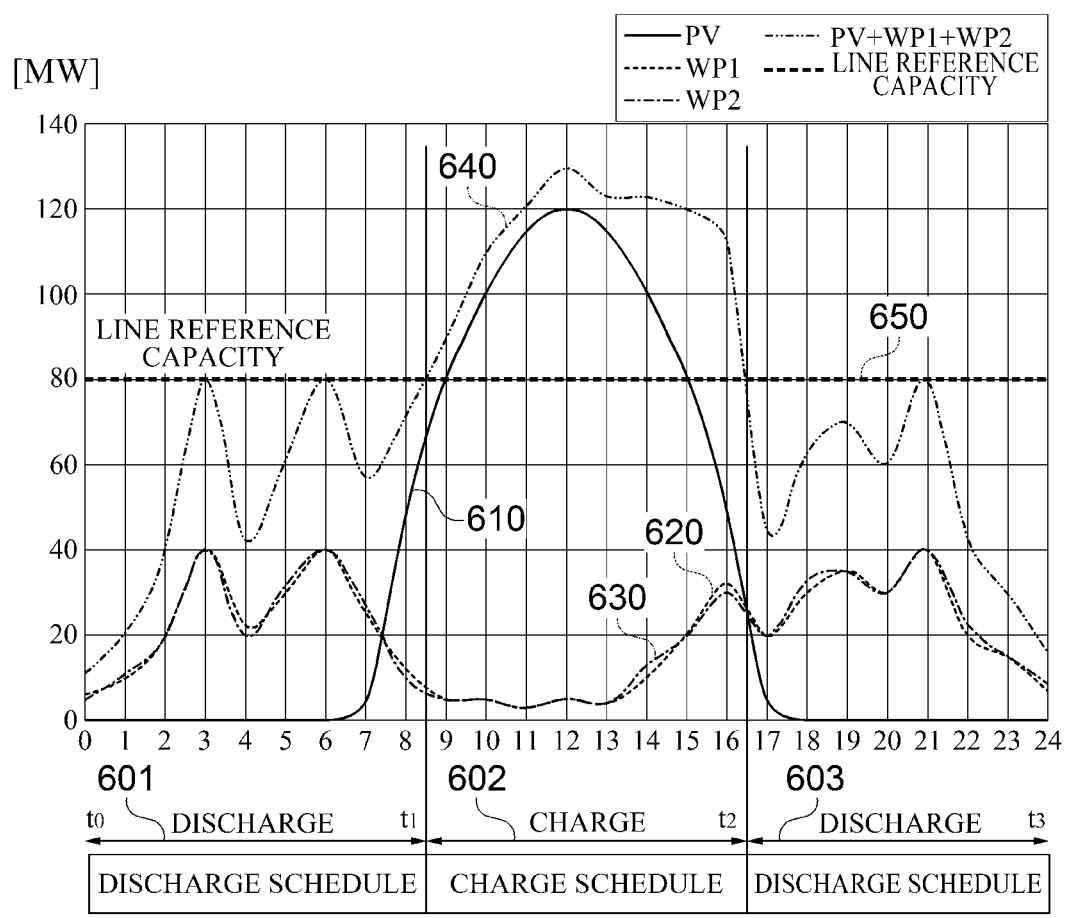
FIG. 4 is a graph for describing an operation of the energy storage system according to an amount of power generated by the renewable energy power station according to an embodiment.

FIG. 4 is a graph for describing the operation of the energy storage system 200 according to the amount of power generated by the new and renewable energy power station 100 according to an embodiment.

For example, it is assumed that there is a solar power station, a first wind power station, and a second wind power station. In addition, it is assumed that the reference capacity of the line 300 is 80 MW. In addition, it is assumed that the first wind power station and the second wind power station are existing new and renewable energy power stations 100, and the solar power station is a newly expanded new and renewable energy power station 100. In addition, it is assumed that a combined maximum capacity of the first wind power station and the second wind power station is 80 MW, and the maximum capacity of the solar power station is 20 MW.

Referring to FIG. 4, a first graph 610 represents the amount of power of the solar power station, a second graph 620 represents the amount of power of the first wind power station, a third graph 630 represents the amount of power of the second wind power station, a fourth graph 640 represents the total power amount of the solar power station, the first wind power station, and the second wind power station, and a fifth graph 650 represents the reference capacity of the line 300.

Referring to FIG. 4, in a section 601 from $t_0$ to $t_1$, the total amount of power does not exceed the reference capacity of the line 300. In a section 602 from $t_1$ to $t_2$, the total amount of power exceeds the reference capacity of the line 300. In a section 603 from $t_2$ to $t_3$, the total amount of power does not exceed the reference capacity of the line 300.

For example, the energy storage system 200 may determine the operation mode of the energy storage device 250 as the discharge mode for the sections where the total amount of power does not exceed the reference capacity of the line 300, and discharge the power charged in the energy storage device 250. That is, when the amount of power produced by the new and renewable energy power station 100 is less than the reference capacity of the line 300, since the line 300 has a surplus in capacity, the energy storage system 200 may discharge the charged power to the line 300. In this case, each renewable energy power station 100 can transmit the produced power through the line 300. As illustrated in FIG. 4, the energy storage system 200 may control the operation of the energy storage system 200 according to the discharge schedule in the section 601 from $t_0$ to $t_1$ and the section 603 from $t_2$ to $t_3$.

For example, the energy storage system 200 may determine the operation mode of the energy storage device 250 as the charge mode for the sections where the total amount of power exceeds the reference capacity of the line 300, and charge power in the energy storage device 250. In this case, the energy storage system 200 may charge an amount of power as large as excess power exceeding the reference capacity in the energy storage device 250. As illustrated in FIG. 4, the energy storage system 200 may control the operation of the energy storage system 200 according to the charging schedule in the section 602 from $t_1$ to $t_2$.

Figure 5:
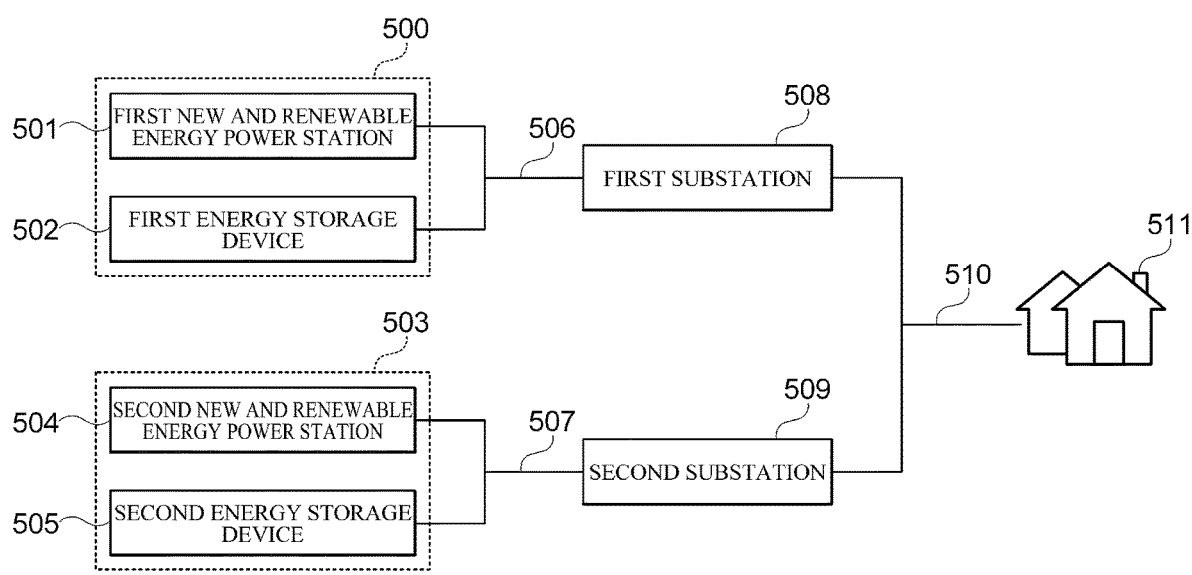
FIG. 5 illustrates a power system that controls a power capacity of an integrated line for supplying power generated by a plurality of renewable energy power stations to an electrical power system through a plurality of substations according to an embodiment.

FIG. 5 illustrates a power system that controls the power capacity of the integrated line for supplying power generated by a plurality of new and renewable energy power stations to the electrical power system through a plurality of substations, according to an embodiment.

This figure is a diagram for describing an example of a power supply process of the electrical power system when there are a plurality of new and renewable energy power stations (e.g., the first new and renewable energy power station 501 and the second new and renewable energy power station 504) and a plurality of substations (e.g., first substation 508 and second substation 509) corresponding thereto, according to an embodiment.

In order to supply power to the electrical power system according to one embodiment, the electrical power system may include a first new and renewable energy power station 501, a first energy storage device 502, a second new and renewable energy power station 504, a second energy storage device 505, a first line 506, a second line 507, a first substation 508, a second substation 509, an integrated line 510, and/or a user 511 of power. One or more modules (not illustrated) in this figure may be further used in order to supply power to the electrical power system according to one embodiment. The description of the first new and renewable energy power station 501 and the second new and renewable energy power station 504 may be the same as the description of the new and renewable energy power station 100 described above with reference to FIGS. 1 to 4. The description of the first energy storage device 502 and the second energy storage device 505 may be the same as the description of the energy storage device 250 described above with reference to FIGS. 1 to 4. The description of the first substation 508 and the second substation 509 may be the same as the description of the substation described above with reference to FIGS. 1 to 4. The description of the first line 506 and the second line 507 may be the same as the description of the line 300 described above with reference to FIGS. 1 to 4.

The first new and renewable energy power station 501 and the first energy storage device 502 according to one embodiment may be located in a first region 500. In addition, the second new and renewable energy power station 504 and the second energy storage device 505 may be located in a second region 503. The first region 500 and the second region 503 may be different regions. That is, the electrical power system illustrated in this figure illustrates an example of a system that supplies power generated in a plurality of regions to the user of power.

The integrated line 510 according to one embodiment may be a line for supplying power generated (or converted) in the first substation 508 and the second substation 509 to the user 511. That is, even if power is generated by a plurality of electric power stations and/or substations in the electrical power system, the entire power can be supplied to the final user 511 of power through one integrated line 510. One or more facilities (e.g., distribution transmission towers) (not illustrated) in this figure may be further included between the integrated line 510 and the user 511.

Power produced (or generated) by the first new and renewable energy power station 501 according to one embodiment may be supplied to the first substation 508 through the first line 506. Power generated by the second new and renewable energy power station 504 according to one embodiment may be supplied to the second substation 509 through the second line 507. Power generated in the first substation 508 and the second substation 509 according to one embodiment may be supplied to the user 511 through the integrated line 510.

The reference capacity of the integrated line 510 according to one embodiment may be equal to the sum of the reference capacity of the first line 506 and the reference capacity of the second line 507. The description of the reference capacity of the line is the same as that described above with reference to FIGS. 1 to 4.

In general, the amount of power to be supplied to the user through the integrated line 510 may be equal to the reference capacity of the integrated line 510. However, there may be a case where the amount of power less than the reference capacity of the integrated line should be supplied to the user through the integrated line 510. For example, when a safety problem occurs on the user 511 side or the integrated line 510 side, or when the amount of power generated in the electric power station and substation is significantly low, etc. the maximum power to be continuously transmitted through the integrated line may be less than the reference capacity of the integrated line 510. Therefore, even in this case, a system that can consistently supply an amount of power less than the reference capacity of the integrated line 510 through the integrated line 510 is needed.

In addition, as described above with reference to FIGS. 1 to 4, a general energy storage system (ESS) can charge or discharge power based on the amount of power generated by the corresponding new and renewable energy power station and the reference capacity of the line. However, when the amount of power to be supplied through the integrated line 510 described above is less than the reference capacity of the integrated line 510, the amount of power to be supplied through the integrated line 510 may not be supplied using only the existing ESS charging/discharging method. For example, with only the existing ESS charging/discharging method, only the same amount of power as the reference capacity of the integrated line 510 can be supplied through the integrated line 510. Therefore, even in this case, a system that determines the amount of charge/discharge power of the ESSs located in different regions through communication between electric power stations, substations, and/or corresponding energy storage devices is needed.

Figure 6:
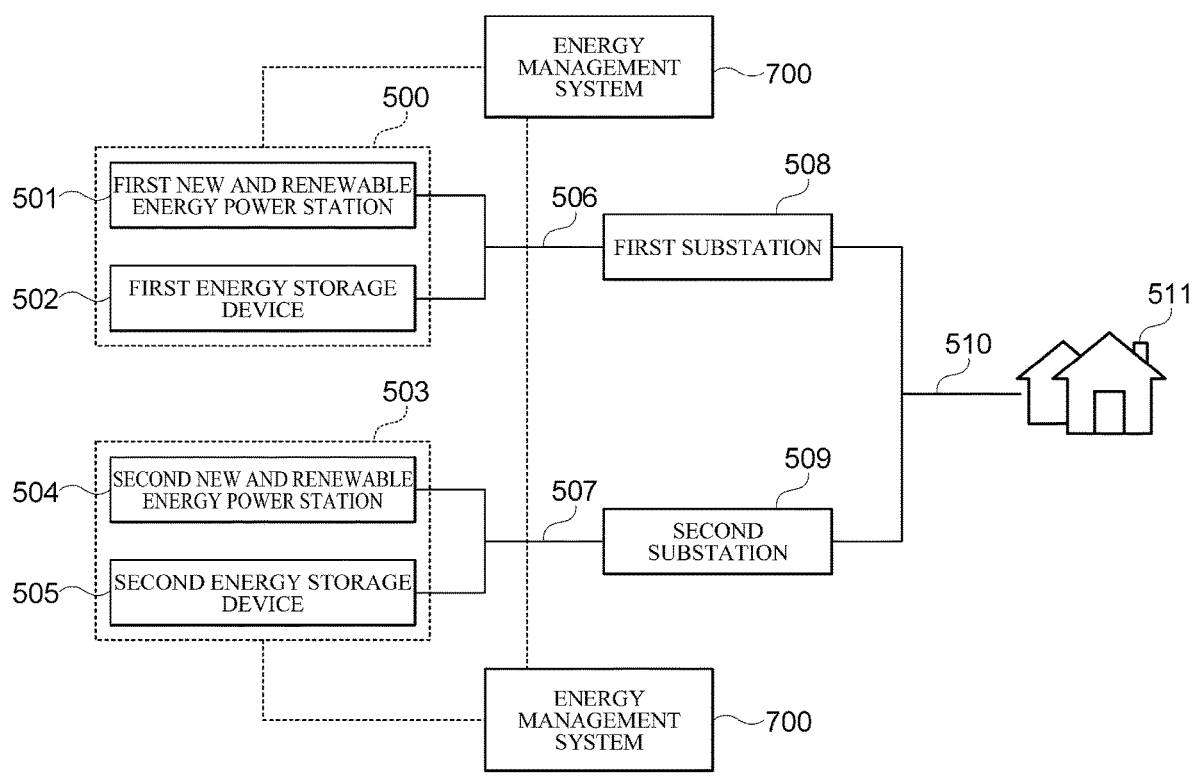
FIG. 6 illustrates an example of an operation of an energy management system according to an embodiment.

FIG. 6 illustrates an example of an operation of an energy management system according to an embodiment.

This figure illustrates an example of the operation of an energy management system 700 according to one embodiment. The energy management system 700 described in this figure can solve the problems described above with reference to FIG. 5. That is, the energy management system 700 according to one embodiment can manage the electric power system to supply an amount of power to be supplied through the integrated line 510 even when the amount of power is less than the reference capacity of the integrated line 510. In addition, the energy management system 700 according to one embodiment can appropriately determine the amount of charge/discharge power of the ESSs located in different regions through communication between electric power stations, substations, and/or corresponding energy storage devices in the electric power system.

As illustrated in this figure, the energy management system 700 may be added to the electric power system described above in FIG. 5.

As described above, when the amount of power to be supplied through the integrated line 510 is less than the reference capacity of the integrated line 510, the energy management system 700 can manage the electric power system to supply an amount of power less than the reference capacity of the integrated line 510 through the integrated line 510. Specifically, the energy management system 700 can manage the amount of power supplied to the integrated line 510 through communication with energy storage devices located in a plurality of regions. For example, the energy management system 700 determines the amount of power to be supplied from the electric power station in each region to the corresponding substation, based on the amount of power stored in each of a plurality of energy storage devices located in a plurality of regions.

The energy management system 700 may receive power amount information indicating the amount of power generated by the first new and renewable energy power station 501, the amount of power stored in the first energy storage device 502 for the first new and renewable energy power station 501, the amount of power produced by the second new and renewable energy power station 504, and the amount of power stored in the second energy storage device 505 for the second new and renewable energy power station 504. For example, the energy management system 700 may receive the power amount information described above through communication with the SCADA controller 450 connected to the energy storage devices 502 and 505.

The energy management system 700 may determine an operation mode for each of the first energy storage device 502 and the second energy storage device 505 based on the received power amount information. The operation mode may be the same or similar to the operation mode described above with reference to FIGS. 1 to 4. For example, the operation mode described in this figure is the same as the operation mode described above with reference to FIGS. 1 to 4 in that it indicates the charge mode or discharge mode, but the charge amount or discharge amount according to each mode is different from that described above with reference to FIGS. 1 to 4.

The operation mode determined by the energy management system 700 may include at least one of a first charge mode indicating charging of the first energy storage device 502, a first discharge mode indicating discharging of the first energy storage device 502, a second charge mode indicating charging of the second energy storage device 505 or a second discharge mode indicating discharging of the second energy storage device 505. That is, the operation mode determined by the energy management system 700 may indicate the operation mode for two or more energy storage devices. For example, the operation mode indicates the charge mode for the first energy storage device 502 and the discharge mode for the second energy storage device 505.

The first energy storage device 502 and the second energy storage device 505 may store different amounts of power. Therefore, when charging or discharging power to the first energy storage device 502 and the second energy storage device 505, more efficient charging/discharging can be performed by considering the amount of power stored in each energy storage device. However, the charging/discharging method of the existing energy storage system described above with reference to FIGS. 1 to 4 may not consider the amount of power stored in the energy storage device.

As described above, the energy management system 700 may determine the operation modes for energy storage devices based on the amount of power received. That is, the energy management system 700 may determine the operation mode for each of the energy storage devices based on the amount of power stored in the first energy storage device 502 and/or the amount of power stored in the second energy storage device 505 For example, when both the first energy storage device 502 and the second energy storage device 505 are determined to be in the discharge mode, the energy management system 700 discharges each of the first energy storage device 502 and the second energy storage device 505 according to the ratio of the amount of stored power.

The energy management system 700 may determine a first distribution criterion for setting the charge amount or discharge amount according to each operation mode of the first energy storage device 502 and the second energy storage device 505 based on the power amount information. The energy management system 700 may control the charging operation or discharging operation of the first energy storage device 502 and the second energy storage device 505 according to the first distribution criterion.

Meanwhile, if the first amount of power supplied through the first line 506 is predicted to exceed the reference capacity of the first line 506 or the second amount of power supplied through the second line 507 is predicted to exceed the standard capacity of the second line 507 as it operates in the operation mode is according to the first distribution criterion, the energy management system 700 may determine, based on the power amount information and reference capacity information of the line, a second distribution criterion for setting the charge amount or discharge amount for each operation mode of the first energy storage device 502 and the second energy storage device 505 such that the first amount of power does not exceed the reference capacity of the first line 506 and the second amount of power does not exceed the reference capacity of the second line 507. The energy management system 700 may control the charging operation or discharging operation of the first energy storage device 502 and the second energy storage device 505 according to the second distribution criterion. The second distribution criterion considers not only the amount of power generated by the new and renewable energy power station and the amount of power stored in energy storage device but also the reference capacity of the line, so that the energy management system 700 can provide a schedule by which power can be stably supplied through the integrated line 510.

Tables 1 to 3 described below are tables for describing the operation of the energy management system 700 when 400 [MW] of power is stored in the first energy storage device 502, 600 [MW] of power is stored in the second energy storage device 505, the amount of power to be supplied through the integrated line 510 (the amount of user supply power) is 700 [MW], the reference capacity of the integrated line 510 is 1000 [MW], the reference capacity of the first line 506 is 500 [MW], and the reference capacity of the second line 507 is 500 [MW] (hereinafter conditions).

TABLE 1

|  | first substation [MW] | second substation [MW] | integrated line [MW] |
|---|---|---|---|
| line reference capacity | 500 | 500 |  |
| power generation amount of electric power station | 600 | 600 |  |
| amount of user supply power |  |  | 700 |
| charge amount | −300 | −200 |  |
| actual supply amount of line | 300 | 400 | 700 |

As illustrated in Table 1, under the conditions described above, each of the first new and renewable energy power station 501 and the second new and renewable energy power station 504 can produce 600 [MW] of power. Therefore, in the same manner as the operation mode determination method described above with reference to FIGS. 1 to 4, the energy management system 700 may determine the charge mode for each of the first energy storage device 502 and the second energy storage device 505. However, as described above, the charge amount according to the charge mode determined by the energy management system 700 may be different from the charge amount according to the charge mode described above with reference to FIGS. 1 to 4.

As illustrated in Table 1, the amount of user supply power is 700 [MW], and thus the first energy storage device 502 and the second energy storage device 505 may need to charge a total of 500 [MW] of power. The energy management system 700 may distribute 500 [MW] of power to be charged to each of the first energy storage device 502 and the second energy storage device 505 based on a ratio of the amount of power stored in the energy storage device.

For example, as in the conditions described above, the ratio of the amount of power stored in the first energy storage device 502 and the second energy storage device 505 is 2:3, and thus the energy management system 700 distributes a power charge amount as the reciprocal of the corresponding ratio. That is, the energy management system 700 stores 300 [MW] of power in the first energy storage device 502 and 200 [MW] in the second energy storage device 505, thereby supplying a total of 700 [MW] of power to the integrated line 510.

That is, if the operation mode includes the first charge mode and the second charge mode, the charge amount according to the first charge mode and the charge amount according to the second charge mode may be determined based on the amount of power stored in the first energy storage device 502 and the amount of power stored in the second energy storage device 505. For example, the ratio of the charge amount according to the second charge mode to the charge amount according to the first charge mode may be the same as the ratio of the amount of power stored in the first energy storage device 502 to the amount of power stored in the second energy storage device 505.

TABLE 2

|  | first substation [MW] | second substation [MW] | integrated line [MW] |
|---|---|---|---|
| line reference capacity | 500 | 500 |  |
| power generation amount of substation | 200 | 250 |  |
| amount of user supply power |  |  | 700 |
| discharge amount | +100 | +150 |  |
| actual supply amount of line | 300 | 400 | 700 |

As illustrated in Table 2, under the conditions described above, the first new and renewable energy power station 501 and the second new and renewable energy power station 504 can produce power of 200 [MW] and 250 [MW], respectively. Therefore, in the same manner as the operation mode determination method described above with reference to FIGS. 1 to 4, the energy management system 700 may determine the discharge mode for each of the first energy storage device 502 and the second energy storage device 505. However, as described above, the discharge amount according to the discharge mode determined by the energy management system 700 may be different from the discharge amount according to the discharge mode described above with reference to FIGS. 1 to 4.

As illustrated in Table 2, the amount of user supply power is 700 [MW], and thus the first energy storage device 502 and the second energy storage device 505 may need to discharge a total of 250 [MW] of power. The energy management system 700 may distribute 250 [MW] of power to be discharged to each of the first energy storage device 502 and the second energy storage device 505 based on the ratio of the amount of power stored in the energy storage device.

For example, as in the conditions described above, the ratio of the amount of power stored in the first energy storage device 502 and the second energy storage device 505 is 2:3, and thus the energy management system 700 distributes the power discharge amount according to the corresponding ratio. That is, the energy management system 700 discharges 100 [MW] of power from the first energy storage device 502 and 150 [MW] from the second energy storage device 505 to supply a total of 700 [MW] of power to the integrated line 510.

That is, if the operation mode includes the first discharge mode and the second discharge mode, the discharge amount according to the first discharge mode and the discharge amount according to the second discharge mode may be determined based on the amount of power stored in the first energy storage device 502 and the amount of power stored in the second energy storage device 505. For example, the ratio of the discharge amount according to the second discharge mode to the discharge amount according to the first discharge mode may be the same as the ratio of the amount of power stored in the second energy storage device 505 to the amount of power stored in the first energy storage device 502.

TABLE 3

|  | first substation [MW] | second substation [MW] | integrated line [MW] |
|---|---|---|---|
| line reference capacity | 500 | 500 |  |
| power generation amount of substation | 550 | 50 |  |
| amount of user supply power |  |  | 700 |
| charge/discharge amount | −250 | +350 |  |
| actual supply amount of line | 300 | 400 | 700 |

As illustrated in Table 3, under the conditions described above, the first new and renewable energy power station 501 and the second new and renewable energy power station 504 can produce power of 550 [MW] and 50 [MW], respectively. Therefore, in the same manner as the operation mode determination method described above with reference to FIGS. 1 to 4, the energy management system 700 may determine the charge mode for the first energy storage device 502 and the discharge mode for the second energy storage device 505. However, as described above, the charge/discharge amount according to the charging/discharge mode determined by the energy management system 700 may be different from the charge/discharge amount according to the charging/discharge mode described above with reference to FIGS. 1 to 4.

As illustrated in Table 3, the amount of user supply power is 700 [MW], and thus the sum of the charge amount of the first energy storage device 502 and the discharge amount of the second energy storage device 505 may be 100 [MW]. In this case, the energy storage device may set the ratio of the amount of power supplied to the first substation 508 through the first line 506 and the amount of power supplied to the second substation 509 through the second line 507 according to the ratio of the amount of power stored in each of the first energy storage device 502 and the second energy storage device 505.

For example, as in the above conditions described, the ratio of the amount of power stored in the first energy storage device 502 and the second energy storage device 505 is 2:3, and thus the energy management system 700 determines the charge amount or discharge amount for each of the first energy storage device 502 and the second energy storage device 505 so that the first amount of power supplied to the first substation 508 through the first line 506 and the amount of power supplied to the second substation 509 through the second line 507 are set according to the corresponding ratio. That is, the energy management system 700 charges 250 [MW] of power in the first energy storage device 502 and discharges 150 [MW] of power from the second energy storage device 505 to supply a total of 700 [MW] of power to the integrated line 510.

As described above, when the operation modes determined for the first energy storage device 502 and the second energy storage device 505 are different, the charge amount or discharge amount may be determined in a different manner from the method described above with reference to Tables 1 and 2.

That is, the operation mode may include the first charge mode and the second discharge mode, or may include the first discharge mode and the second charge mode. In this case, the ratio of the amount of power supplied to the second substation 509 through the second line 507 to the amount of power supplied to the first substation 508 through the first line 506 may be the same as the ratio of the amount of power stored in the second energy storage device 505 to the amount of power stored in the first energy storage device 502.

TABLE 4

|  | first substation [MW] | second substation [MW] | integrated line [MW] |
| --- | --- | --- | --- |
| line reference capacity | 500 | 500 |  |
| power generation amount of substation | 600 | 600 |  |
| amount of user supply power |  |  | 700 |
| charge amount | −450 | −50 |  |
| actual supply amount of line | 150 | 550 | 700 |
| modified actual supply amount of line | 200 | 500 | 700 |

Table 4 is a table for describing the case where, unlike the conditions applied to Tables 1 to 3, 50 [MW] of power is stored in the first energy storage device 502 and 450 [MW] of power is stored in the second energy storage device 505. Other conditions are the same as those applied to Tables 1 to 3 above.

As illustrated in Table 3, under the conditions described above, each of the first new and renewable energy power station 501 and the second new and renewable energy power station 504 can produce 600 [MW] of power. In addition, as described above with reference to Table 1, the ratio of the amount of power stored in the first energy storage device 502 and the amount of power stored in the second energy storage device 505 is 1:9, and thus the energy management system 700 can charge the first energy storage device 502 with 450 [MW] of power and the second energy storage device 505 with 50 [MW] of power.

However, if the method described above with reference to Table 1 is applied as it is, the amount of power supplied through the second line 507 (550 [MW]) may be greater than the reference capacity of the second line 507 (500 [MW]). In this case, the energy management system 700 may modify the charge amount distribution method.

For example, if the amount of power to be supplied through a specific line exceeds the reference capacity of the corresponding line as a result of distributing using the distribution method described above with reference to Tables 1 to 3, the energy management system 700 may further store the excess amount of power in the energy storage device corresponding to the corresponding line.

For example, the amount of power to be supplied through the second line 507 exceeds the reference capacity of the second line 507 by 50 [MW] as illustrated in Table 4, as a result of distributing using the distribution method described above with reference to Table 1 by the energy management system 700, and thus the excess power of 50 [MW] may be further stored in the second energy storage device 505 corresponding to the second line 507.

In addition, the energy management system 700 may manage the amount of power supplied through the integrated line 510 according to the method described above with reference to FIGS. 1 to 4 rather than the method described above with reference to Tables 1 to 4. In this case, the amount of power to be supplied through the integrated line 510 may be equal to the reference capacity of the integrated line 510. That is, the energy management system 700 can maintain the amount of power supplied through the integrated line 510 constant (for example, maintain it at the reference capacity of the integrated line 510) by maintaining the amount of power supplied through the first line 506 and the second line 507 constant (for example, maintaining it at the reference capacity of each of the lines) according to the method described above with reference to FIGS. 1 to 4. The method of maintaining, by the energy management system 700, the amount of power supplied to the first line 506 and/or the second line 507 constant is the same or similar to the method of maintaining, by the energy storage system 200, the amount of power supplied to the line 300 constant as described above with reference to FIGS. 1 to 4.

The energy management system 700 according to one embodiment can manage the electrical power system to supply the corresponding amount of power even when the amount of power to be supplied through the integrated line 510 connected to a plurality of substations according to the method described with reference to this figure is less than the reference capacity of the integrated line 510. In particular, the energy management system 700 can appropriately determine the amount of charge/discharge power of the ESSs located in different regions through communication between electric power stations, substations, and/or corresponding energy storage devices in the electric power system.

Figure 7:
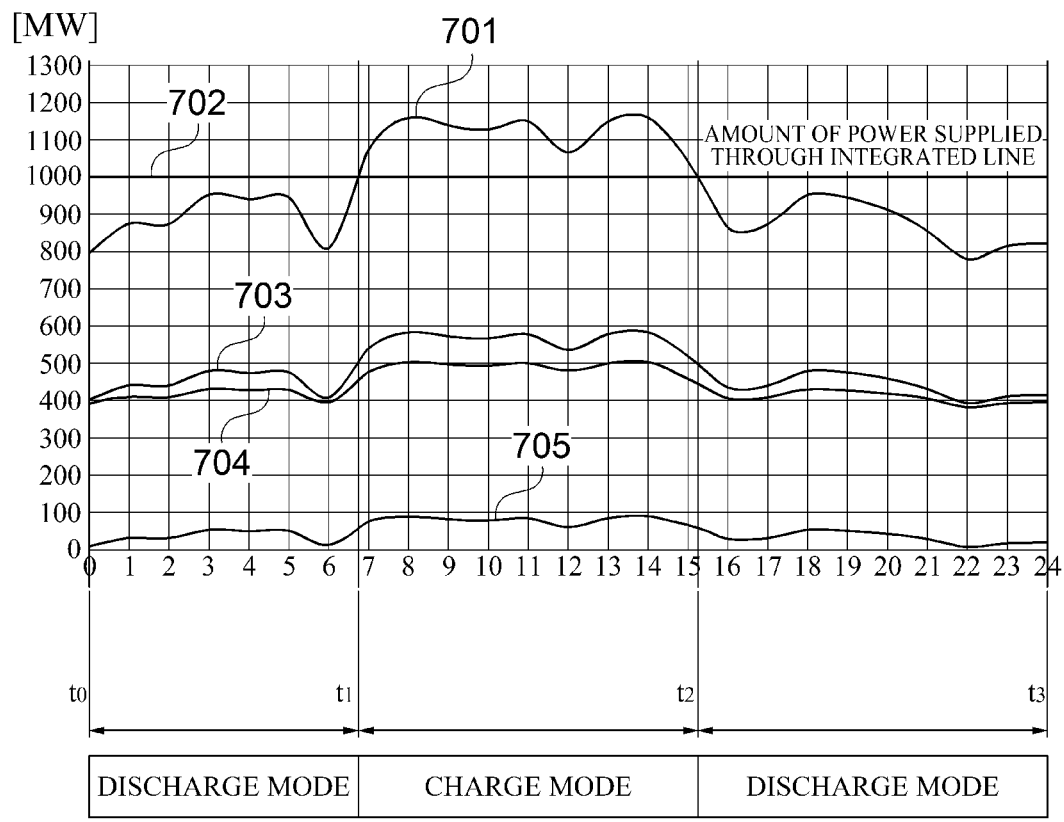
FIG. 7 is a graph for describing an example of an operation of the energy management system according to an embodiment.

FIG. 7 is a graph for describing an example of the operation of the energy management system according to an embodiment.

This figure is a graph illustrating an example of the operation (operation described above with reference to FIGS. 5 and 6) of the energy management system 700 according to an embodiment.

As illustrated in this figure, an amount of power 702 to be supplied through the integrated line 510 may have a constant value (e.g., 1000 [MW]). In addition, as described above with reference to FIGS. 5 and 6, the reference capacity of the integrated line 510 may be greater than the amount of power to be supplied through the integrated line 510.

The amount of power 701 generated by a plurality of electric power stations may be the total of an amount of power 703 generated by the first new and renewable energy power station 501, an amount of power 704 generated by the second new and renewable energy power station 504 and/or, an amount of power 705 generated by a newly added new and renewable energy power station. The newly added new and renewable energy power station may indicate a new and renewable energy power station newly established in the first region 500 and/or the second region 503, other than the first new and renewable energy power station 501 and the second new and renewable energy power station 504. That is, the amount of power 701 generated by a plurality of electric power stations may include both the amount of power generated by the existing electric power stations and/or the amount of power generated by the newly added electric power stations.

For example, the energy management system 700 may determine the discharge mode for the first energy storage device 502 and the second energy storage device 505 when the amount of power 701 generated by a plurality of electric power stations is less than the amount of power 702 to be supplied through the integrated line 510 (section from $t_0$ to $t_1$ and section from $t_2$ to $t_3$). The method of calculating the discharge amount according to the discharge mode determined by the energy management device may be the same as the method described above with reference to FIG. 6.

For example, when the amount of power 701 generated by a plurality of electric power stations is greater than the amount of power 702 to be supplied through the integrated line 510 (section from $t_1$ to $t_2$), the energy management system 700 may determine the charge mode for the first energy storage device 502 and the second energy storage device 505. The method of calculating the charge amount according to the charge mode determined by the energy management device may be the same as the method described above with reference to FIG. 6.

The energy management system 700 according to one embodiment can manage the power system to supply the corresponding amount of power even when the amount of power to be supplied through the integrated line 510 connected to a plurality of substations is less than the reference capacity of the integrated line 510 according to the method described in this figure. In particular, the energy management system 700 can appropriately determine the amount of charge/discharge power of the ESSs located in different regions through communication between electric power stations, substations, and/or corresponding energy storage devices in the electric power system.

Figure 8:
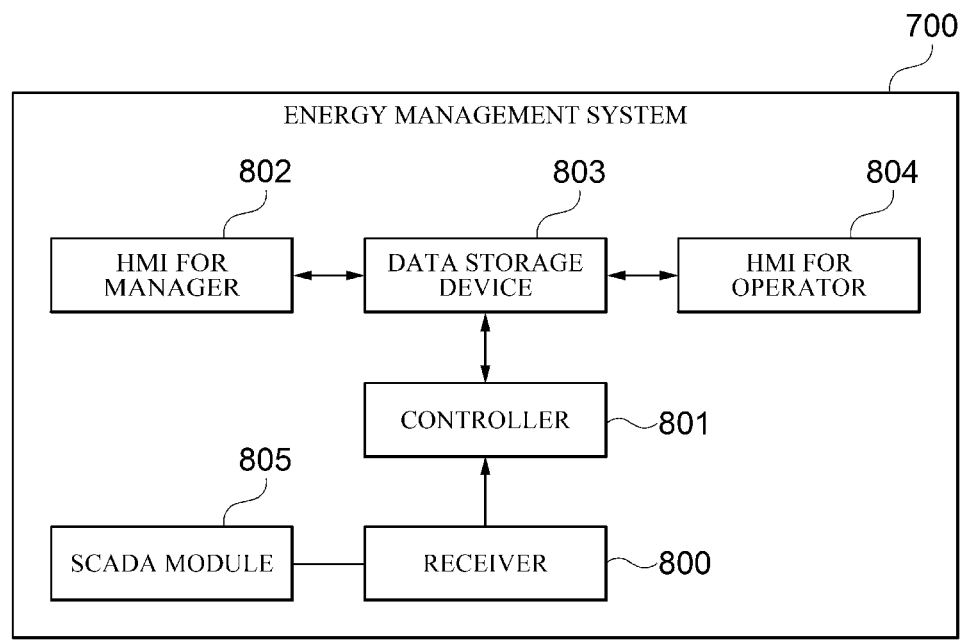
FIG. 8 is an example of a structure of an energy management system according to an embodiment.

FIG. 8 is an example of a structure of the energy management system according to an embodiment.

This figure is a block diagram illustrating an example of a structure of the energy management system 700 according to one embodiment. The energy management system 700 may include a receiver 800, a controller 801, an HMI 802 for manager, a data storage device 803, an HMI 804 for operator, and/or a SCADA module 805. The energy management system 700 may further include one or more modules not illustrated in this figure.

The receiver 800 according to one embodiment may receive power amount information indicating the amount of power generated by the first new and renewable energy power station 501, the amount of power stored in the first energy storage device 502 for the first new and renewable energy power station 501, the amount of power produced by the second new and renewable energy power station 504, and the amount of power stored in the second energy storage device 505 for the second new and renewable energy power station 504. The detailed description of the power amount information is the same as that described above with reference to FIGS. 5 to 7.

The controller 801 according to one embodiment may determine the operation mode for each of the first energy storage device 502 and the second energy storage device 505 based on the received power amount information. The detailed description of the method for determining the operation mode based on the received power amount information is the same as that described above with reference to FIGS. 5 to 7.

The data storage device 803 according to one embodiment may store received power amount information. Therefore, the controller 801 can determine the operation mode based on the power amount information stored in the data storage device 803.

The human machine interface (HMI) 802 for manager according to one embodiment may be a dashboard for monitoring the energy management system 700 for a manager of the energy management system 700. For example, the manager of the energy management system 700 can monitor the operation of the energy management system 700 through the HMI 802 for manager.

The human machine interface (HMI) 804 for operator according to one embodiment may be the dashboard for monitoring the energy management system 700 for an operator of the energy management system 700. For example, the manager of the energy management system 700 may monitor the operation of the energy management system 700 through the HMI 804 for operator.

The supervisory control and data acquisition (SCADA) module 805 (or SCADA system) according to one embodiment may assist in receiving the power amount information described above for the receiver 800. That is, the receiver 800 can receive the power amount information based on the SCADA module 805. For example, the SCADA module 805 collects, for the receiver 800, data about the amount of power generated by the first new and renewable energy power station 501, the amount of power stored in the first energy storage device 502 for the first new and renewable energy power station 501, the amount of power produced by the second new and renewable energy power station 504, and the amount of power stored in the second energy storage device 505 for the second new and renewable energy power station 504.

The energy management system 700 according to one embodiment can manage the electrical power system to supply the corresponding amount of power even when the amount of power to be supplied through the integrated line 510 connected to a plurality of substations is less than the reference capacity of the integrated line 510 according to the structure described in this figure. In particular, the energy management system 700 can appropriately determine the amount of charge/discharge power of the ESSs located in different regions through communication between electric power stations, substations, and/or corresponding energy storage devices in the electric power system.

Figure 9:
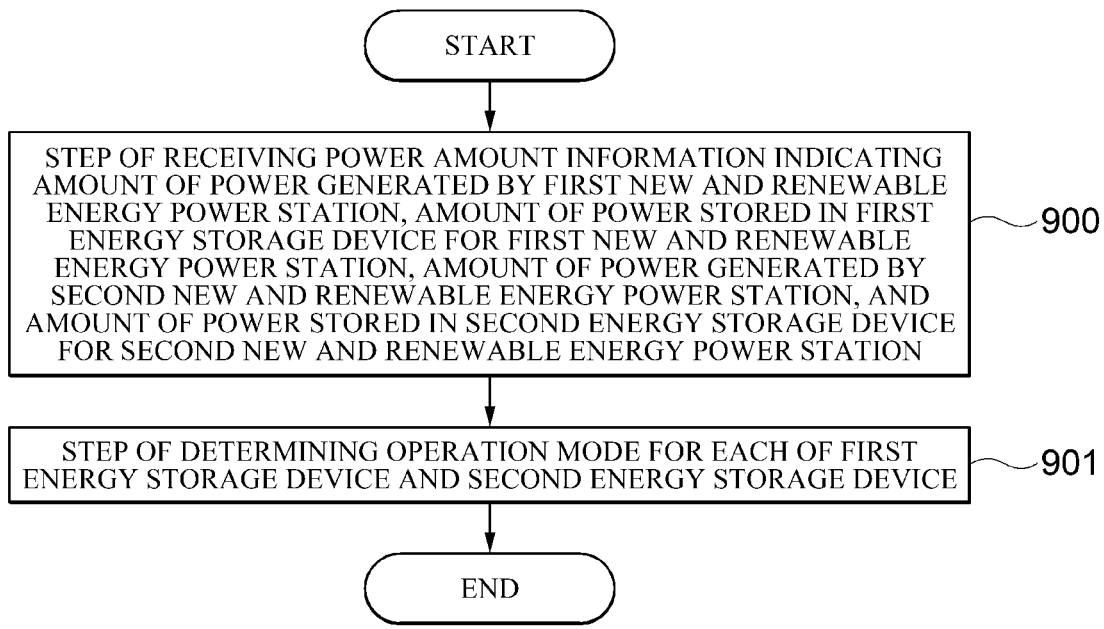
FIG. 9 is a flowchart illustrating an example of a method of operation of the energy management system according to an embodiment.

FIG. 9 is a flowchart illustrating an example of a method of operation of the energy management system according to an embodiment.

This figure is a flowchart for describing an example of a method of operation of the energy management system 700 according to one embodiment.

The method of operation of the energy management system 700 according to one embodiment may include a step of receiving power amount information indicating an amount of power generated by a first new and renewable energy power station, an amount of power stored in a first energy storage device for the first new and renewable energy power station, an amount of power produced by a second new and renewable energy power station, and an amount of power stored in a second energy storage device for the second new and renewable energy power station (900) and/or a step of determining an operation mode for each of the first energy storage device and the second energy storage device based on the received power amount information (901). The method of operation of the energy management system 700 may further include one or more steps not illustrated in this figure.

Power generated by the first new and renewable energy power station 501 may be supplied to the first substation 508 through the first line 506. Power generated by the second new and renewable energy power station 504 may be supplied to the second substation 509 through the second line 507. Power generated in the first substation 508 and the second substation 509 may be supplied to the user through the integrated line 510.

The reference capacity of the integrated line 510 may be equal to the sum of the reference capacity of the first line 506 and the reference capacity of the second line 507. The amount of power supplied to users through the integrated line 510 may be less than the reference capacity of the integrated line 510.

The operation mode may include at least one of the first charge mode indicating charging of the first energy storage device 502, the first discharge mode indicating discharging of the first energy storage device 502, the second charge mode indicating charging of the second energy storage device 505 or a second discharge mode indicating discharging of the second energy storage device 505.

If the operation mode includes the first charge mode and the second charge mode, the charge amount according to the first charge mode and the charge amount according to the second charge mode may be determined based on the amount of power stored in the first energy storage device 502 and the amount of power stored in the second energy storage device 505.

For example, the ratio of the charge amount according to the second charge mode to the charge amount according to the first charge mode is the same as the ratio of the amount of power stored in the first energy storage device 502 to the amount of power stored in the second energy storage device 505.

If the operation mode includes the first discharge mode and the second discharge mode, the discharge amount according to the first discharge mode and the discharge amount according to the second discharge mode may be determined based on the amount of power stored in the first energy storage device 502 and the amount of power stored in the second energy storage device 505.

For example, the ratio of the discharge amount is equal to the ratio of the discharge amount according to the second discharge mode to the discharge amount according to the first discharge mode is the same as the ratio of the amount of power stored in the second energy storage device 505 to the amount of power stored in the first energy storage device 502.

If the operation mode includes the first charge mode and the second discharge mode, or includes the first discharge mode and the second charge mode, the ratio of the amount of power supplied to the second substation 509 through the second line 507 to the amount of power supplied to the first substation 508 through the first line 506 may be the same as the ratio of the amount of power stored in the second energy storage device 505 to the amount of power stored in the first energy storage device 502.

The energy management system 700 may determine, based on the power amount information, the first distribution criterion for setting the charge amount or discharge according to each operation mode of the first energy storage device 502 and the second energy storage device 505. The energy management system 700 may control the charging operation or discharging operation of the first energy storage device 502 and the second energy storage device 505 according to the first distribution criterion.

Meanwhile, if the first amount of power supplied through the first line 506 is predicted to exceed the reference capacity of the first line 506 or the second amount of power supplied through the second line 507 is predicted to exceed the standard capacity of the second line 507 as it operates in the operation mode is according to the first distribution criterion, the energy management system 700 may determine, based on the power amount information and reference capacity information of the line, the second distribution criterion for setting the charge amount or discharge amount for each operation mode of the first energy storage device 502 and the second energy storage device 505 such that the first amount of power does not exceed the reference capacity of the first line 506 and the second amount of power does not exceed the reference capacity of the second line 507. The energy management system 700 may control the charging operation or discharging operation of the first energy storage device 502 and the second energy storage device 505 according to the second distribution criterion. The second distribution criterion considers not only the amount of power generated by the new and renewable energy power station and the amount of power stored in energy storage device but also the reference capacity of the line, so that the energy management system 700 can provide a schedule by which power can be stably supplied through the integrated line 510.

The step of receiving the power amount information (900) may be performed based on the supervisory control and data acquisition (SCADA) system.

The energy management system 700 according to one embodiment may manage the electrical power system to supply the corresponding amount of power even when the amount of power to be supplied through the integrated line 510 connected to a plurality of substations is less than the reference capacity of the integrated line 510 according to the operation described with reference to this figure. In particular, the energy management system 700 can appropriately determine the amount of charge/discharge power of the ESSs located in different regions through communication between electric power stations, substations, and/or corresponding energy storage devices in the electric power system.

The energy storage system 200, the energy management system 700, and the power system described in this disclosure may be implemented with hardware components, software components, and/or a combination of hardware components and software components. In addition, the present disclosure may be provided in the form of a computer program stored in a computer-readable storage medium so that the method of operation of the energy storage system 200 and the power system is performed. In addition, the present disclosure can be written as a program that can be executed on a computer, and can be implemented in a general-purpose digital computer that executes such a program using the computer-readable storage medium.

Such a computer-readable storage medium may include a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and may be any device that can store instructions or software, related data, data files, and data structures and provide the instructions or software, related data, data files, and data structures to a processor or computer so that the processor or computer can execute the instructions.

According to the disclosed embodiments, even if the new and renewable energy power station is expanded, the line can be operated without the expansion of the line by adjusting the load of the line using the energy storage system, and investment costs for line expansion can be reduced.

According to the disclosed embodiments, even when the amount of power to be supplied through the integrated line is less than the reference capacity of the integrated line, the electrical power system can be managed so as to supply the corresponding amount of power.

According to the disclosed embodiment, the amount of charge/discharge power of the ESSs located in different regions can be appropriately determined through communication between electric power stations, substations, and/or corresponding energy storage devices in the electrical power system.

Although the embodiments have been described in detail above, the scope of rights of the present disclosure is not limited thereto, and various modifications and improvements made thereto by those skilled in the art using the basic concept of the present disclosure defined in the following claims also fall within the scope of rights of the present disclosure.

What is claimed is:

1. An energy management system comprising:
    a receiver configured to receive power amount information including first power amount information about an amount of power generated by a first new and renewable energy power station located in a first region and an amount of power stored in a first energy storage device, which is located in the first region, for the first new and renewable energy power station and second power amount information about an amount of power generated by a second new and renewable energy power station located in a second region and an amount of power stored in a second energy storage device, which is located in the second region, for the second new and renewable energy power station; and
    a controller configured to determine an operation mode for each of the first energy storage device and the second energy storage device based on the received power amount information and a distribution criterion for setting a charge or discharge amount according to the operation mode,
    wherein the power generated by the first new and renewable energy power station is supplied to a first substation through a first line, the power produced by the second new and renewable energy power station is supplied to a second substation through a second line, power generated in the first and second substations is supplied to a user through an integrated line,
    a reference capacity of the integrated line is equal to a sum of a reference capacity of the first line and a reference capacity of the second line, and the amount of power supplied to the user through the integrated line is less than the reference capacity of the integrated line, and
    if a first amount of power supplied through the first line is predicted to exceed the reference capacity of the first line or a second amount of power supplied through the second line is predicted to exceed the second reference capacity of the second line as the first second energy storage device or the second energy storage device operates in the operation mode according to the distribution criterion, the controller is configured to, based on the power amount information and reference capacity information of the line, modify the distribution criterion so that an amount of power supplied through the line does not exceed the reference capacity of the line and an amount of user supply power corresponding to a sum of the first amount of power and the second amount of power is supplied through the integrated line.

2. The energy management system of claim 1, wherein the operation mode includes at least one of a first charge mode indicating charging of the first energy storage device, a first discharge mode indicating discharging of the first energy storage device, a second charge mode indicating charging of the second energy storage device, or a second discharge mode indicating discharging of the second energy storage device.

3. The energy management system of claim 2, wherein, if the operation mode includes the first charge mode and the second charge mode, the charge amount according to the first charge mode and the charge amount according to the second charge mode are determined based on the amount of power stored in the first energy storage device and the amount of power stored in the second energy storage device.

4. The energy management system of claim 3, wherein a ratio of the charge amount according to the second charge mode to the charge amount according to the first charge mode is the same as a ratio of the amount of power stored in the first energy storage device to the amount of power stored in the second energy storage device.

5. The energy management system of claim 2, wherein, if the operation mode includes the first discharge mode and the second discharge mode, the discharge amount according to the first discharge mode and the discharge amount according to the second discharge mode are determined based on the amount of power stored in the first energy storage device and the amount of power stored in the second energy storage device.

6. The energy management system of claim 5, wherein a ratio of the discharge amount according to the second discharge mode to the discharge amount according to the first discharge mode is the same as a ratio of the amount of power stored in the second energy storage device to the amount of power stored in the first energy storage device.

7. The energy management system of claim 2, wherein, if the operation mode includes the first charge mode and the second discharge mode, or includes the first discharge mode and the second charge mode, a ratio of an amount of power supplied to the second substation through the second line to an amount of power supplied to the first substation through the first line is the same as a ratio of the amount of power stored in the second energy storage device to the amount of power stored in the first energy storage device.

8. The energy management system of claim 1, wherein the receiver is configured to receive the power amount information based on a supervisory control and data acquisition (SCADA) system.

9. A method of operation of an energy storage system, the method comprising:
    receiving power amount information including first power amount information about an amount of power generated by a first new and renewable energy power station located in a first region and an amount of power stored in a first energy storage device, which is located in the first region, for the first new and renewable energy power station and second power amount information about an amount of power generated by a second new and renewable energy power station located in a second region and an amount of power stored in a second energy storage device, which is located in the second region, for the second new and renewable energy power station; and determining an operation mode for each of the first energy storage device and the second energy storage device based on the received power amount information and a distribution criterion for setting a charge or discharge amount according to the operation mode, wherein the power generated by the first new and renewable energy power station is supplied to a first substation through a first line, the power produced by the second new and renewable energy power station is supplied to a second substation through a second line, power generated in the first and second substations is supplied to a user through an integrated line, a reference capacity of the integrated line is equal to a sum of a reference capacity of the first line and a reference capacity of the second line, and the amount of power supplied to the user through the integrated line is less than the reference capacity of the integrated line, and if a first amount of power supplied through the first line is predicted to exceed the reference capacity of the first line or a second amount of power supplied through the second line is predicted to exceed the second reference capacity of the second line as the first second energy storage device or the second energy storage device operates in the operation mode according to the distribution criterion, the controller is configured to, based on the power amount information and reference capacity information of the line, modify the distribution criterion so that an amount of power supplied through the line does not exceed the reference capacity of the line and an amount of user supply power corresponding to a sum of the first amount of power and the second amount of power is supplied through the integrated line.

10. The method of claim 9, wherein the operation mode includes at least one of a first charge mode indicating charging of the first energy storage device, a first discharge mode indicating discharging of the first energy storage device, a second charge mode indicating charging of the second energy storage device, or a second discharge mode indicating discharging of the second energy storage device.

11. The method of claim 10, wherein, if the operation mode includes the first charge mode and the second discharge mode, or includes the first discharge mode and the second charge mode, a ratio of an amount of power supplied to the second substation through the second line to an amount of power supplied to the first substation through the first line is the same as a ratio of the amount of power stored in the second energy storage device to the amount of power stored in the first energy storage device.

12. A power system comprising:
a first new and renewable energy power station located in a first region;
a second new and renewable energy power station located in a second region;
a first energy storage device, which is located in the first region, for the first new and renewable energy power station;
a second energy storage device, which is located in the second region, for the second new and renewable energy power station;
a first line that supplies power generated by the first new and renewable energy power plant to a first substation, a second line that supplies power generated by the second new and renewable energy power plant to a second substation;
an integrated line configured to supply power generated in the first substation and second substation to a user, a reference capacity of the integrated line being equal to a sum of a reference capacity of the first line and a reference capacity of the second line, an amount of power supplied to the user through the integrated line being less than the reference capacity of the integrated line; and
an energy management system configured to receive power amount information indicating an amount of power generated by the first new and renewable energy power plant, an amount of power stored in the first energy storage device, an amount of power generated by the second new and renewable energy power plant, and an amount of power stored in the second energy storage device and determine an operation mode for each of the first energy storage device and the second energy storage device based on the received power amount information,
wherein, if a first amount of power supplied through the first line is predicted to exceed the reference capacity of the first line or a second amount of power supplied through the second line is predicted to exceed the second reference capacity of the second line as the first second energy storage device or the second energy storage device operates in the operation mode according to the distribution criterion, the energy management system is configured to, based on the power amount information and reference capacity information of the line, modify the distribution criterion so that an amount of power supplied through the line does not exceed the reference capacity of the line and an amount of user supply power corresponding to a sum of the first amount of power and the second amount of power is supplied through the integrated line.

* * * * *